Patented Jan. 1, 1929.

1,696,975

UNITED STATES PATENT OFFICE.

FRITZ ROTHE, OF BERLIN, AND HANS BRENEK, OF PORZ, NEAR COLOGNE, GERMANY, ASSIGNORS TO THE FIRM: RHENANIA KUNHEIM VEREIN CHEMISCHER FABRIKEN A. G., OF BERLIN, GERMANY.

PROCESS FOR PREPARING FERTILIZER.

No Drawing. Application filed January 26, 1927, Serial No. 163,829, and in Germany June 23, 1924.

The invention has reference to the process for obtaining fertilizers described and claimed in our application, Serial No. 36,549. The process described in this patent consists in subjecting a mixture of mineral phosphorites and alkali salts in the presence of steam and silica to a heating process at a temperature of at least 900° Celsius, care being taken for obtaining a special proportion of materials in the mixture to be treated. It is stated in our earlier patent as a particular advantage of the new process, that it thereby becomes possibe to utilize alkali metal sulphate as an alkali metal compound reacting with mineral phosphorites.

Now we found that it is also possible and very advantageous to utilize alkali metal chlorides as materials containing alkali in the same process. The utilization of these materials is also very economical, due to the facts, that the alkali metal chlorides are comparatively cheap alkali compounds and that it is not possible to make use of them in the processes formerly known for transferring the phosphoric acid existing in the natural phosphorites in an insoluble form into a form easily to be taken up by plants.

The mode of operating in the case of alkali metal chlorides is quite similar to that described for other alkili-compounds. The reaction between mineral phosphorites and alkali metal chlorides is effected at a temperature of at least 900° C. in the presence of steam and of such quantities of silica, that the mixture to be treated contains at least one molecule of silica for every molecule of alkali metal chloride. Furthermore care must be taken that the silica used can be bound as calcium-orthosilicate ($2CaO.SiO_2$). If the mixtures does not contain a sufficient quantity of lime, limestone or the like is added for this purpose.

It may be pointed out that the silica required for the reaction may be added in the form of phosphites rich in silica, and that in some cases the silica may be replaced wholly or in part by argillaceous earth or iron-oxide.

It is advantageous to use fuels containing hydrogen for the purpose of heating the mixture, as such fuels form vapour at their combustion which acts upon the mixture in the moment of sintering. In this manner the special addition of steam becomes wholly or in part unnecessary.

It is also possible to heat the phosphorites together with materials containing alkali metal chlorides and alkali metal sulphates, for instance a mixture of alkali metal chlorides and alkali metal sulphates or materials containing alkali metal chlorides and alkali metal sulphate may be used.

Under the conditions above referred to there will be obtained a fertilizer containing practically the total amount of its phosphoric acid in a citrate-soluble state.

Example.

100 parts of a North African crude phosphate with 39.7% of $P_2O_5$, 47.0% of CaO bound in phosphoric acid, 5.61% of CaO not bound in phosphoric acid and 0.56% of $SiO_2$ were thoroughly mixed with 44.5 parts of a technical potassium chloride with a content of 60% of $K_2O$, 15.5 parts of quartz and 20 parts of lime stone. The mixture was heated at a temperature of about 1000° steam being guided over it. The heated product contained:

27.6% of total phosphoric acid and
26.7% of citrate soluble phosphoric acid (soluble in ammoniacal ammoncitrate solution according to Petermann) that is to say 97% of the total phosphoric acid are citrate soluble.

What we claim and desire to secure by Letters Patent of the United States is:—

1. A process for preparing fertilizers, comprising the mixing of mineral phosphorites with alkali metal chlorides and subjecting said mixture, in the presence of steam, to a heating process at temperatures of at least 900° C., such quantities of alkali metal chlorides, and such quantities of lime and silica being present that the mixture to be heated contains for every molecule of $P_2O_5$ about one molecule of alkali metal chlorides and at least one molecule of silica and for every molecule of silica such quantities of lime that, in addition to an alkali calcium phosphate, orthosilicate may be formed.

2. A process for preparing fertilizers, comprising the mixing of mineral phosphorites with alkali metal chlorides crude phosphates containing lime and silica and subjecting said mixture, in the presence of steam, to a heating process at temperatures of at least 900° C., such quantities of crude phosphates containing lime and silica being present that the mixture to be heated contains for every molecule of $P_2O_5$ about one molecule of alkali metal chlorides and at least one molecule of silica and for every molecule of silica such quantities of lime that, in addition to an alkali calcium phosphate, orthosilicate may be formed.

3. A process of preparing fertilizers, comprising the mixing of mineral phosphorites with such quantities of alkali metal chlorides that the mixture contains for every molecule of $P_2O_5$ about 1 molecule of alkali metal chloride and at least one molecule of silica, silica and lime being present in such proportion that in addition to an alkali calcium phosphate calcium orthosilicate may be formed and subjecting said mixture to a heating process at temperatures of at least 900° C. by combustion of a fuel containing hydrogen which is able to form at least in part the steam required for the reaction.

4. A process for preparing fertilizers, comprising the mixing of mineral phosphorites with alkali metal chlorides and alkali metal sulphates, and subjecting said mixture in the presence of steam, to a heating process at temperatures of at least 900° C., such quantities of alkali metal salts, and such quantities of lime and silica being present that the mixture to be heated contains for every molecule of $P_2O_5$ about one molecule of alkali metal oxide and at least one molecule of silica and for every molecule of silica such quantities of lime that, in addition to an alkali calcium phosphate, orthosilicate may be formed.

5. A phosphatic fertilizer containing practically the total phosphoric acid, but at least 75 per cent thereof, in a citrate soluble form, obtained from a mixture containing mineral phosphorites, by the reaction substantially as described.

6. A process for preparing fertilizers, comprising the mixing of mineral phosphorites with alkali metal chlorides, subjecting said mixture in the presence of steam to a heating process at temperatures of at least 900° C., such quantities of alkali metal chlorides and such quantities of lime and of such equivalents of silica which are able to bind the lime being present, that the mixture to be heated contains for every molecule of $P_2O_5$ about one molecule of alkali metal chlorides and at least one molecule of equivalent of silica and for every molecule of equivalent of silica such quantities of lime that in addition to an alkali calcium phosphate a calcium compound corresponding to calcium orthosilicate may be formed.

7. A process for perparing fertilizers, comprising the mixing of mineral phosphorites with alkali metal chlorides, subjecting said mixture in the presence of steam to a heating process at temperatures of at least 900° C., such quantities of alkali metal chlorides and such quantities of lime and silica and of such equivalents of silica which are able to bind the lime being present, that the mixture to be heated contains for every molecule of $P_2O_5$ about one molecule of alkali metal chlorides and at least one molecule of silica and its equivalents and for every molecule of silica and its equivalents such quantities of lime that in addition to an alkali calcium phosphate calcium orthosilicate and other calcium compounds corresponding to calcium orthosilicate may be formed.

FRITZ ROTHE.
HANS BRENEK.